United States Patent [19]

Katz et al.

[11] Patent Number: 4,863,541
[45] Date of Patent: Sep. 5, 1989

[54] APPARATUS AND METHOD FOR MANUFACTURING HEAT-SHRINKABLE SLEEVE USING SOLID CORE

[75] Inventors: Carlos Katz, Edison; Attila Dima, Piscataway, both of N.J.

[73] Assignee: Cable Technology Laboratories, Inc., New Brunswick, N.J.

[21] Appl. No.: 645,013

[22] Filed: Aug. 28, 1984

[51] Int. Cl.$^4$ ................ B29C 47/06; B29C 47/28
[52] U.S. Cl. .................. 156/158; 156/304.2; 156/304.6; 156/503; 264/28; 264/515; 264/516; 264/565; 264/149; 264/150; 264/151; 264/173; 264/209.1; 264/210.1; 264/230; 425/89; 425/113; 425/296; 425/297; 425/324.1; 425/381
[58] Field of Search .......... 264/103, 565, 171, 230, 264/28, 515, 516, 149, 150, 151, 173, 209.1, 210.1; 425/190, 89, 113, 296, 297, 324.1, 381; 156/158, 304.2, 304.6, 503

[56] References Cited

U.S. PATENT DOCUMENTS

4,446,095  5/1984  Katz et al. ..................... 264/565
4,472,126  9/1984  Mitsui et al. ................... 264/103

Primary Examiner—Hubert Lorin
Attorney, Agent, or Firm—Darby & Darby

[57] ABSTRACT

Long lengths of a heat-shrinkable sleeve for use in splicing electrical cables and the like are manufactured by providing an elongated impermeable core having a smooth outer surface, extruding an elongated sleeve around and in contact with the core, the sleeve having a smooth inner surface conforming to the outer surface of the core, and effecting an initial expansion of a portion of the sleeve to a larger diameter in an expansion zone so that the sleeve separates from the core and leaves a space between the sleeve and core. A fluid is introduced into the space under pressure via a fitting at the downstream end of the sleeve while continuously advancing the sleeve and core through the expansion zone. To begin the process, a permeable core is used, and the sleeve is extruded around and in contact with the permeable core. A fluid is introduced under pressure from a fitting upstream or downstream of the expansion zone through the permeable core to the inside of the sleeve in the expansion zone, and the leading end of the impermeable core is welded to the trailing end of the permeable core at a location upstream of the expansion zone. The sleeve has a composite structure comprising an inner compound and an outer compound, the inner and outer compounds having different characteristics. In a first crosshead, the inner compound and a thin layer of outer compound are applied, and the balance of the outer compound is applied around the sleeve in a second crosshead. Between the two crossheads, liquid nitrogen cools and stabilizes the inchoate sleeve.

45 Claims, 4 Drawing Sheets

APPARATUS AND METHOD FOR MANUFACTURING HEAT-SHRINKABLE SLEEVE USING SOLID CORE

BACKGROUND OF THE INVENTION

This invention relates to heat-shrinkable sleeves for use in splicing electrical cables and the like and, more particularly, to a novel and highly-effective method and apparatus for manufacturing such sleeves, and to sleeves made by the method and apparatus.

U.S. Pat. No. 4,446,095, issued May 1, 1984, on an invention of Katz and Zidon, discloses the most efficient method of manufacturing long lengths of heat-shrinkable sleeves heretofore known. In accordance with the invention which is the subject of that patent, a sleeve is formed around a permeable core, and the core and sleeve are advanced together in an axial direction, the leading end of the advancing sleeve being hermetically sealed. The core and sleeve pass through a heating station, thereby heating a portion of at least the sleeve, and a fluid is introduced under pressure into the core, thereby internally pressurizing the sleeve to effect a radial expansion of the heated portion thereof. The core and sleeve then pass through a cooling station, thereby cooling the expanded sleeve to stabilize it.

The core is removed from the sleeve, and the sleeve is cut to suitable lengths which are used to join electrical cables and the like. When the sleeves are heated on site, they shrink around the cable ends and help to form a permanent splice.

It is desirable to make the interior of the sleeves as smooth as possible, because of the high-voltage electrical environment in which the sleeves are used. In accordance with the prior process, one or more binders or tapes are applied over the permeable core. The binders are preferably of a high temperature resistant film or paper. The binders are removed from the sleeve together with the metallic core before the sleeve is used in joining or splicing cables.

The use of such binders renders the inside of the sleeve relatively smooth. However, because of the unevenness of the permeable core (which may be a stranded conductor, for example) and ridge lines where successive layers of the binder overlap, the interior of the sleeve cannot be made perfectly smooth by the prior process.

The problem is exacerbated by the tendency of the compound to work its way between adjacent layers of the binder under the high pressures employed in the process of manufacturing the sleeve. The irregularities or discontinuities of the inner surface of the sleeve can give rise to cracks in the sleeve when it is expanded. At a minimum, some additional processing (machining) is required before the sleeves can be utilized.

SUMMARY OF THE INVENTION

An object of the invention is to make a further advance in the art of manufacturing long lengths of a heat-shrinkable sleeve for use in splicing electrical cables and the like. In particular, an object of the invention is to provide a method and apparatus for manufacturing a heat-shrinkable sleeve having a perfectly smooth interior surface.

Another object of the invention is to provide a method and apparatus for manufacturing a heat-shrinkable sleeve wherein the overall insulation wall thickness is reduced.

Still another object of the invention is to provide a method and apparatus for manufacturing a heat-shrinkable sleeve which is built up in a plurality of layers in a single continuous process in such a manner that an outer layer can be extruded around an inner layer without deforming the latter or otherwise causing damage.

The foregoing and other objects are attained in accordance with the invention by providing an elongated impermeable core having a smooth outer surface, extruding an elongated sleeve around and in contact with the core, the sleeve having a smooth inner surface conforming to the outer surface of the core, and effecting an expansion of a portion of the sleeve to a larger diameter in an expansion zone so that the sleeve separates from the core and leaves a space between the sleeve and core.

A fluid is introduced into the space between the sleeve and core under pressure while continuously advancing the sleeve and core through the expansion zone. In this manner, successive portions of the sleeve are expanded by the fluid as they advance through the zone.

To start the process, an elongated permeable core is provided, and a sleeve is extruded around and in contact with the permeable core. The leading end of the sleeve is provided with a sealed fitting, and fluid is introduced under pressure through the fitting and permeable core to the inside of the sleeve in the expansion zone. The leading end of the impermeable core is welded to the trailing end of the permeable core at a location upstream of the expansion zone. Once the process has been initiated, the expansion fluid continues to be introduced through the fitting at the leading end of the sleeve.

The sleeve has a composite structure comprising an inner compound and an outer compound, the inner and outer compounds having different characteristics. A first crosshead is provided having a tip, an intermediate aperture radially outward and downstream of the tip, and a die radially outward and downstream of the intermediate aperture.

The core (whether permeable or impermeable) is passed through the tip, the inner compound is extruded between the tip and intermediate aperture, and the outer compound is extruded between the intermediate aperture and the die. The intermediate aperture thus functions as a die for the inner compound and as a tip for the outer compound, whereby an inchoate sleeve is formed around the core.

The core and inchoate sleeve are passed through a second crosshead, and an additional quantity of the outer compound is extruded around the inchoate sleeve within the second crosshead. An insulation shield may be applied over the insulation by a final extruder in the second crosshead.

The inchoate sleeve is cooled between the first and second crossheads. The cooling is preferably accomplished by liquid nitrogen.

In accordance with the invention, it is possible to switch from one take-up reel to another without stopping the process.

BRIEF DESCRIPTION OF THE DRAWING

A better understanding of the invention can be gained from a consideration of the following detailed description of the preferred embodiments thereof, taken in conjunction with the appended figures of the drawing, wherein.

DESCRIPTION OF THE PREFERRED EMBODIMENTS

Figure 1A:
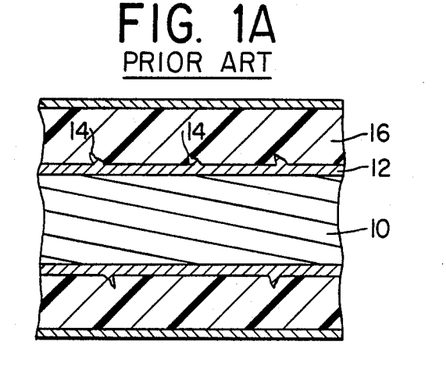
FIG. 1A is an axial sectional view of a portion of a core and sleeve constructed in accordance with the prior art illustrating protrusions into the cable insulation caused by hard conducting particles.

FIG. 1A shows protrusions caused by hard conducting particles in accordance with processes of the prior art. A core 10 has a layer 12 of semiconducting compound extruded around and in contact with the core 10. The core 10 is permeable and may, for example, be a stranded conductor.

Hard particles incorporated in the semiconducting compound forming the layer 12 may pop up when the layer 12 leaves the die of the upstream crosshead, resulting in protrusions 14 into the layer 16 of insulating compound.

Figure 1B:
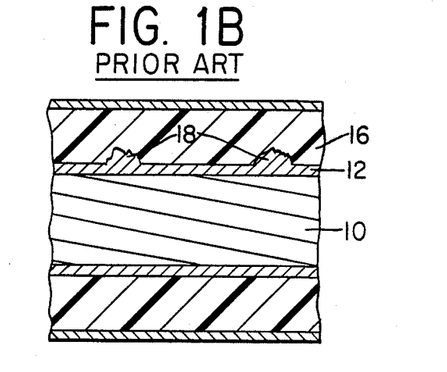
FIG. 1B is a view similar to FIG. 1A illustrating protrusions into the cable insulation occurring in processes of the prior art because of die bleed in an upstream crosshead.

FIG. 1B shows die bleed lumps or masses 18 on the surface of the semiconducting layer 12. Die bleed is a small deposit of semiconducting compound accumulated on the outer surface of the crosshead die. The accumulated compound occasionally works loose and becomes deposited on the outer surface of the inner layer 12. Since this compound is semiconducting, it is tantamount to protrusions of semiconductor into the insulation 16, which give rise to high voltage stresses conducive to premature breakdown of the sleeve.

Figure 1C:
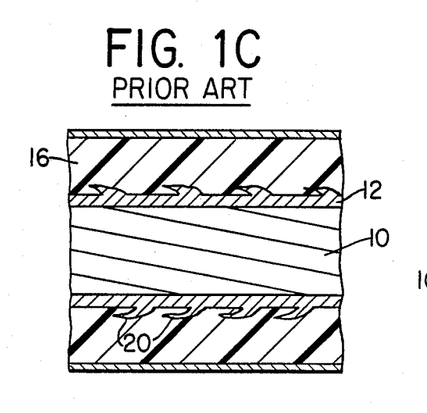
FIG. 1C is a view similar to FIG. 1A showing irregularities caused by push-back of semiconducting compound in a downstream crosshead employed by prior art processes.
Figure 1D:
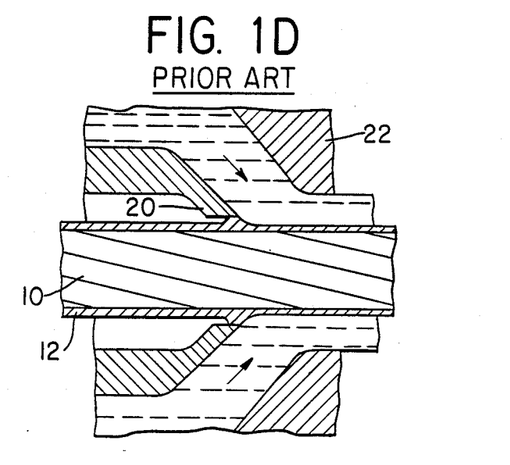
FIG. 1D is a longitudinal sectional view showing the effect of insulating compound pressures on a thin layer of an inner shield in processes of the prior art.
Figure 1E:
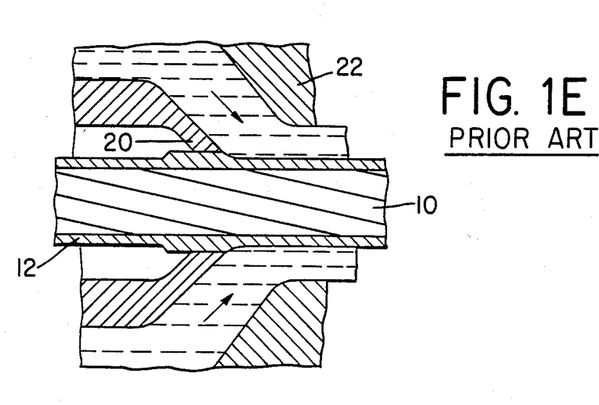
FIG. 1E is a view similar to FIG. 1D showing the effect of insulating compound pressures on a heavy layer of inner shield in accordance with the prior art.

FIG. 1C shows push-back irregularities 20 due to heavy thickness of the inner layer 12 and high pressures employed during the extrusion of the insulation 16. When the insulation layer 16 is applied over the core, the pressures tend to push back the inner layer 12. The effect is somewhat significant when the inner layer 12 is thin, as illustrated in FIG. 1D, and very significant when the pressures are high and the inner layer 12 is relatively thick, as illustrated in FIG. 1E. FIGS. 1D and 1E show a tip 20 and die 22 of a downstream crosshead employed in the prior art.

Figure 2:
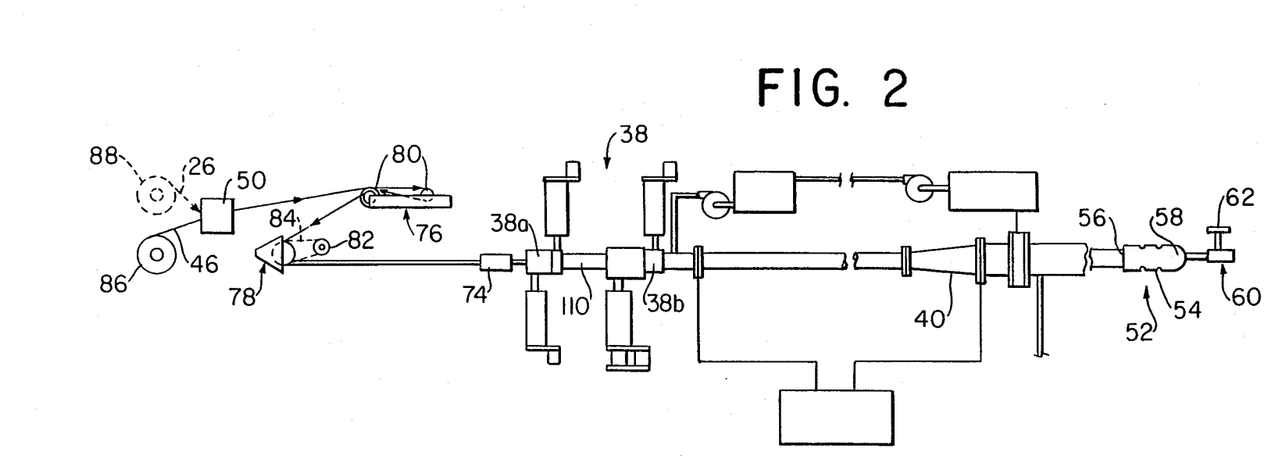
FIG. 2 is a schematic view of apparatus in accordance with the present invention.
Figure 3A:
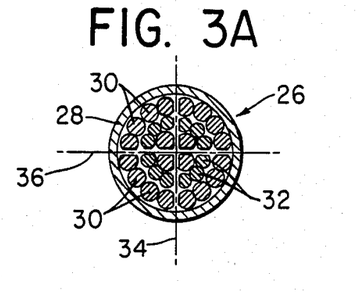
FIG. 3A is a cross-sectional view of a portion of the apparatus of FIG. 2 showing on a larger scale one form of impermeable core employed in the method and apparatus of the present invention.
Figure 4:
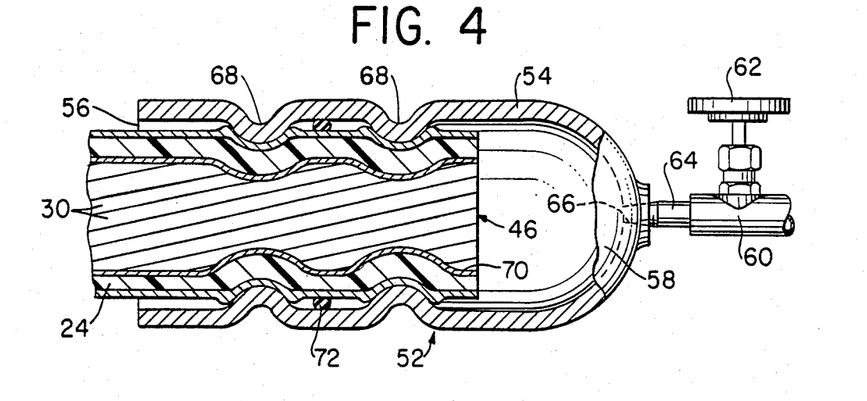
FIG. 4 is a longitudinal sectional view of a portion of the apparatus of FIG. 2 showing on a larger scale an end fitting employed in accordance with the present invention.
Figure 5:
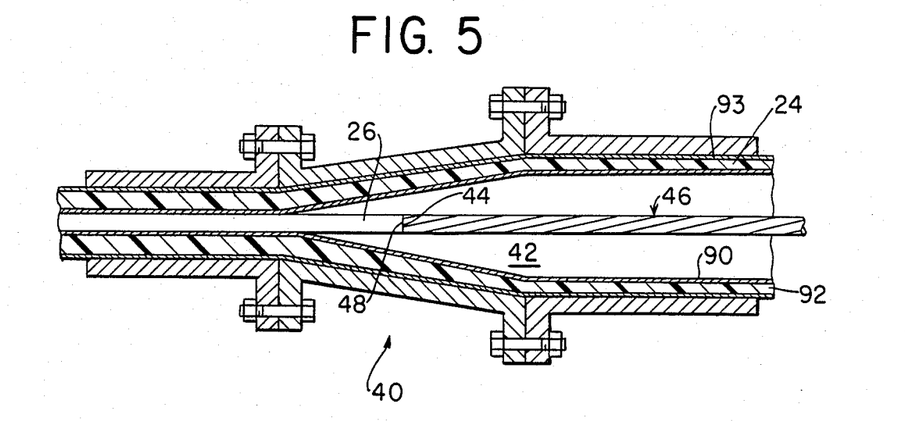
FIG. 5 is a longitudinal sectional view of a portion of the apparatus of FIG. 2 showing on a larger scale an expansion zone employed in accordance with the present invention.

FIG. 2 shows apparatus in accordance with the present invention for avoiding the problems of the prior art outlined above. A part of FIG. 2 is the same as apparatus disclosed in said U.S. Pat. No. 4,446,095 and therefore is not described herein. The disclosure of that patent is incorporated herein by reference. The apparatus of the present invention manufactures long lengths of a heat-shrinkable sleeve 24 (FIGS. 4 and 5) for use in splicing or joining electrical cables and the like. The method comprises providing an elongated impermeable core 26 (FIG. 5) having a smooth outer surface (FIGS. 3A and 5). As FIG. 3A shows, the impermeable or solid core 26 has a smooth skin 28 of cylindrical cross section enclosing a plurality of strands 30 arranged in four quadrants 32 defined by a vertical plane 34 and a horizontal plane 36.

In an alternative embodiment of impermeable core 26' (FIG. 3B) a smooth skin 28' encloses strands 30' which have a somewhat larger diameter than the strands 30 and are arranged in concentric circles. Both forms of core are conventional per se.

Figure 3B:
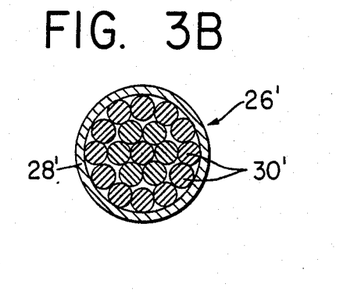
FIG. 3B is a view similar to FIG. 3A showing a structure alternative thereto.

In the embodiments of FIGS. 3A and 3B, the use of stranded wires 30 or 30' covered by an extruded or drawn tube of aluminum or other metal (aluminum is preferred) helps to maintain the flexibility of the core 26 or 26', so that the core is suitable for winding on a payoff or takeup reel. The core may also be made of a synthetic material. In any case, the extreme downstream end of the core should be sealed to prevent the loss of fluid through the core interior.

Extrusion means indicated generally at 38 (FIG. 2) is provided for extruding the elongated sleeve 24 (FIG. 5) around and in contact with the core 26. The sleeve 24 has a smooth inner surface conforming to the outer surface of the core 26.

After curing, a portion of the sleeve 24 is heated and expanded to a larger diameter in an expansion zone 40 (FIGS. 2 and 5) so that the sleeve 24 separates from the core 26 and leaves a space 42 between the sleeve 24 and core 26.

One method of accomplishing this expansion by introducing a fluid such as pressurized gas from a source upstream of the expansion zone 40 through the permeable core 46 to the inside of the sleeve 24 in the expansion zone 40 is disclosed in said U.S. Pat. No. 4,446,095.

After this initial expansion, a fluid is introduced into the space 42 under pressure while continually advancing the sleeve 24 and core 26 through the expansion zone 40. Successive portions of the sleeve 24 are thus expanded by the fluid as they advance through the expansion zone 40.

The impermeable core 26 is formed with a leading end 44, and the effecting of the initial expansion of the sleeve 24 preferably comprises the following steps performed before the leading end 44 of the impermeable core 26 reaches the expansion zone 40:

First, an elongated permeable core 46 is provided, the permeable core 46 having a trailing end 48. The extrusion means 38 (FIG. 2) extrudes the sleeve 24 around and in contact with the permeable core 46, and fluid is introduced under pressure through the permeable core 46 to the inside of the sleeve 24 in the expansion zone 40.

A welding unit 50 (FIG. 2) forms a connection of the leading end 44 of the impermeable core 26 to the trailing end 48 of the permeable core 46 at a location upstream of the expansion zone 40.

Once the initial expansion is achieved in this manner, fluid is (preferably pressurized gas) introduced into the space 42 via a location downstream of the expansion zone 40. FIG. 4 shows a fitting 52 adapted to this purpose. It comprises a generally cylindrical portion 54 open at one end 56 to accommodate the sleeve 24 and having a hemispherical structure 58 at the other end adapted to accommodate a valve 60 having a manual or other control member 62. The valve 60 admits a fluid such as a pressurized gas by means of a fitting 64 which penetrates an aperture 66 in the hemispherical portion 58, thus admitting the pressurized gas to the interior of the fitting 52 when the valve 60 is open.

The fitting 52 is formed with grooves 68 which extend circumferentially of the fitting 52 and deform the leading end 70 of the sleeve 24 which is inserted into the fitting 52. An O-ring 72 is inserted on the inside of the fitting 52 and around the outside of the sleeve 24 longitudinally at a position between the grooves 68 in order to form a fluid-tight seal around the end 70 of the sleeve 24. The fitting 52 is conveniently connected to the end 70 of the sleeve 24 which is wound on a takeup reel (not shown).

Thus the pressurized gas admitted into the fitting 52 is admitted also into the interior of the sleeve 54 through the open end 70 thereof. This pressurized gas is in communication with the space 42 (FIG. 5) in the expansion zone 40 (which may be a considerable distance away), so that, after the impermeable core 26 arrives at the expansion zone 40, the sleeve 24 nevertheless continues to expand as successive, portions thereof pass through the expansion zone 40.

To effect the initial expansion, the expansion fluid in one embodiment of the invention, though not the preferred embodiment, is introduced into the space 42 via a fitting 74 (FIG. 2) upstream of the expansion zone 40. The fitting 74 and associated structure serves as a source of fluid under pressure and may be similar to the structure 136, 138 and associated structure shown in FIG. 5 of said patent identified above.

Alternatively and preferably, the structure 74 may be dispensed with, and the expansion may be brought about from the very beginning by pressurized fluid (preferably gas) introduced through the fitting 52.

In order to weld the trailing end 48 (FIG. 5) of the permeable core 46 to the leading end 44 of the impermeable core 26 at the welding station 50 (FIG. 2), it is necessary to immobilize both cores at that station 50 for a certain period of time. During this interval, it is desirable to continue the progress of the sleeve 24 and permeable core 46 through the apparatus including the expansion zone 40. To permit this to occur, an accumulator 76 (FIG. 2) is provided in accordance with the invention. The structural details of the accumulator 76 are immaterial so long as the accumulator 76 permits a metering capstan 78 to continue to feed the permeable core 46 to the extrusion means 38 so that the sleeve 24 can continue to be formed.

By way of example only, the accumulator 76 may comprise rollers 80, at least one of the rollers being movably mounted in such a manner as to permit a variable length of the core 46 to be accommodated. The metering capstan 78 is also of conventional construction and may include a motor 82 and a belt or other driving connection 84 for turning the capstan 78.

Two supply reels or payoff reels 86 and 88 are provided for supplying the permeable core 46 and impermeable core 26, respectively. The permeable core 46 is initially supplied first to the accumulator 76, then around the metering capstan 78, to the extrusion means 38, and the apparatus downstream thereof. After the trailing end 48 of the permeable core 46 :s welded automatically or manually at the welding station 50 to the leading end 44 of the impermeable core 26, the accumulator 76 can in principle be bypassed, since it is no longer needed. However, since the core 46 has already been threaded through the accumulator 76 and since the core 26 is now welded to the core 46, it is preferable to allow the core 26 to be threaded through the accumulator 76 en route to the metering capstan 78 and the apparatus downstream thereof.

The outside diameter of the impermeable core 26 is limited to a value substantially equal to the outside diameter of the permeable core 46 so that the core 26 follows the core 46 without becoming snagged on the component 38, and components downstream thereof.

Figure 2A:
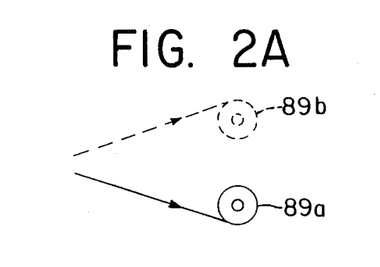
FIG. 2A is a schematic view of a modification of a portion of the apparatus of FIG. 2.

It is possible in accordance with the invention to manufacture continuous lengths of a heat-skrinkable sleeve without interruption of the process when it becomes necessary switch take-up reels, for example from reel 89a to reel 89b (FIG. 2A). For this purpose, welding of the core involves only the outer smooth surface or, instead of using the types of cores illustrated in FIGS. 3A and 3B, a tubing may be utilized. In this manner, the interior of the core does not obstruct the continuous flow of fluid. An additional piece of equipment 89 (FIG. 2) is provided upstream of the expansion zone 40 and preferably upstream of the accumulator 76. This piece o equipment introduces a number of small perforations around the outside surface of the core. The perforations are covered by a layer of material, such as paper, which prevents the flow of the first layer of compound into the holes. The perforations are of very small diameter but large in number and cover a distance of several meters. Perforation are made only when it becomes necessary to switch take-up reels. The location of the perforations is calculated in accordance with the particular characteristics of the extrusion process.

Once it is established that it will soon be necessary to replace a full reel, containing the manufactured sleeve, with an empty reel, perforations are made at such a time as to ensure that they will be in the cooled part of the expansion section at the time the switch-over cut is made. Prior to cutting, a section of the expanded sleeve is shrunk down onto the core (while moving towards the take-up reel). This is easily accomplished by the application of heat, since the sleeve is heat-shrinkable. Pressure is removed for a short time to allow for cutting the sleeve. As soon as possible thereafter, a new pressurizing fitting is applied at the end of the new length, and fluid pressure is applied. The perforations previously made in the core allow the fluid to escape from the core and enter the space 42 to restart the expansion process in the new section of sleeve emerging from the curing pipe. In this manner, no interruption in the extrusion process is required.

In accordance with one independent aspect of the invention, the heat-shrinkage sleeve has a composite structure comprising an inner compound and an outer compound, the inner and outer compounds having different characteristics.

FIG. 5 shows an inner compound 90 forming a semiconducting layer and an outer compound 92 forming an insulating layer. A semiconducting insulation shield 93 may also be provided. The extrusion means 38 shown schematically in FIG. 2 applies these three compounds in four extrusion steps. One of the novel features of the invention is the use of two insulation layers to obtain a higher breakdown strength. The extrusion means 38 comprises an upstream crosshead 38a and downstream crosshead 38b.

Figure 6:
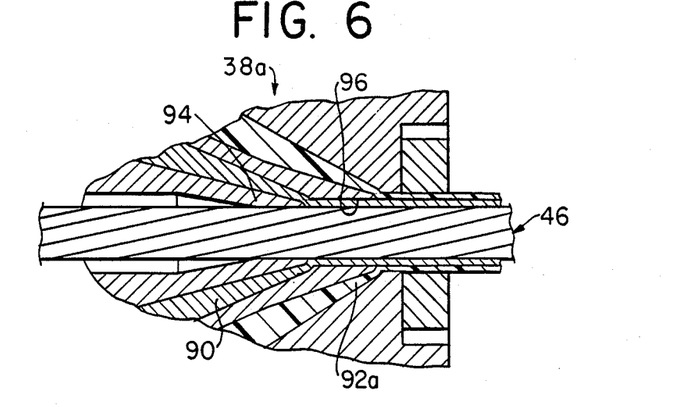
FIG. 6 is a longitudinal sectional view of a portion of the apparatus of FIG. 2 showing on a larger scale a first or upstream crosshead for applying a conductor shield and auxiliary insulation in accordance with the invention.

FIG. 6 is a longitudinal sectional view through the first or upstream crosshead 38a. This first crosshead 38a comprises a tip 94, an intermediate aperture 96 radially outward and downstream of the tip 94 and a die 98 radially outward and downstream of the intermediate aperture 96.

The core 46 (and subsequently the core 26) is passed through the tip 94, and the inner compound 90 is extruded between the tip 94 and intermediate aperture 96. A first layer 92a of the outer compound 92 is extruded between the intermediate aperture 96 and the die 98. The intermediate aperture 96 thus functions as a die for the inner compound 90 and as a tip for the outer compound 92. An inchoate sleeve is thus formed around the core 46 or 26.

Figure 8:
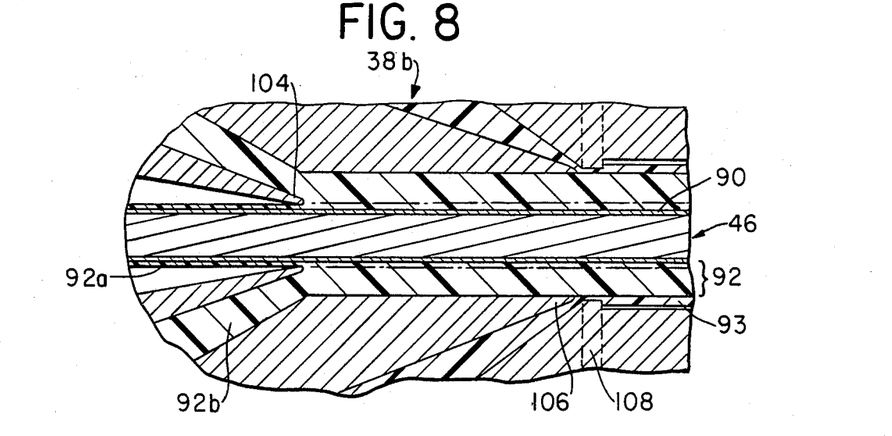
FIG. 8 is a longitudinal sectional view of a portion of FIG. 2 showing on a larger scale a second or downstream crosshead for applying insulation and an insulation shield in accordance with the invention.

The inchoate sleeve is subsequently passed through the second or downstream crosshead 38b (FIG. 8), which applies an additional layer 92b of the outer compound 92 and the layer of insulation shield 93. This crosshead comprises a tip 104, an intermediate aperture 106 radially outward and downstream of the tip 104, and a die 108 radially outward and downstream of the intermediate aperture 106. The layer 92b is extruded between the tip 104 and intermediate aperture 106, and the layer 93 is extruded between the intermediate aperture 106 and the die 108. The intermediate aperture 106 functions as a die for the layer 92b and as a tip for the layer 93, thus completing the formation of the sleeve.

A semiconducting compound is preferably selected as the inner compound 90 and an insulating compound is preferably selected as the outer compound 92, which forms the layers 92a and 92b.

The extrusion of the layer 92a of insulating compound in the crosshead 38a permits a decrease in the overall thickness of the insulation required to support the operational voltage. This achievement is due to the elimination of sharp imperfections at the interface (see FIGS. 1A through 1E) which otherwise require an extra thickness of insulation to withstand the increased voltage stresses. A reduction of wall thickness in excess of 15% is achievable.

This structure eliminates the defects of the prior art noted above. For example, the hard particles incorporated in the semiconducting compound are not able to pop up when the layer 90 leaves the first crosshead 38a, since the layer 90 is already covered by the layer 92a. (Compare FIG. 1A, which represents the prior art.)

Moreover, die bleed as illustrated in FIG. 1B does not occur, since the thin layer 92a of insulation is applied directly over the inner semiconductor layer 90, by the common crosshead 38a. Since the intermediate aperture 96 serves as a die for the compound 90 and as a tip for application of the compound 92, no possibility of die bleed of the semiconducting compound exists.

This arrangement also eliminates the possibility of damage to the inner semiconducting layer 90 when entering the second crosshead 38b, where additional insulation is applied. The tip 104 of the extruder crosshead 38b (FIG. 8) has a very close tolerance (in diameter) with respect to the core with the inchoate sleeve thereon feeding to the crosshead 38b. This tolerance may be 0.01 to 0.04 inches in diameter, depending on the overall diameter of the core, and is required to avoid pushing the insulation compound backward. When the insulation layer is applied directly over the semi-conducting layer in the crosshead 38b, the pressure tends to push back the semiconducting layer. The effect, as illustrated in FIGS. 1D and 1E, is somewhat significant when the inner layer is thin and very significant when the pressures are high and the inner layer is relatively thick. In the manufacturing of a sleeve capable of withstanding high voltages, pressures are very high and result in surface irregularities detrimental to the integrity of the sleeve. Additionally, when the core vibrates under normal manufacturing conditions, the soft inner layer abrades against the tip, and irregularities in the form of additional protrusions, indentations, etc., occur. These irregularities result in voltage stress concentrations. The inner layer of the sleeve must be relatively thick because it is normal to expand the sleeve one to two times its original diameter.

In accordance with the invention, the application in the first crosshead 38a of a thin layer 92a of insulating compound having the same or similar insulating characteristics as those of the insulating layer or layers applied in the main, second or downstream crosshead 38b protects the semiconducting layer 90 against irregularities. Any irregularities caused upon entry into the second crosshead 38b occur in the insulating layer 92a which overlies and protects the layer 90. The integrity and smoothness of the inner semiconducting layer 90 are thus preserved. Irregularities on the surface of the auxiliary layer 92a of insulation are without importance, because, upon application of additional layer 92b of the same or similar material, the irregularities blend with the main insulation without causing points of high stress concentration. Under the high pressures and crosslinking effects, an intimate bond occurs between the surface of the two insulating layers 92a and 92b of the compound 92. Since stress enhancement due to inner semiconducting layer irregularities are eliminated, a thinner overall insulating wall can be afforded. The layer 92a of insulating material applied in the upstream crosshead 38a does not need to be heavy. A thickness of 0.03 or preferably 0.04 inches suffices for this purpose.

In accordance with another independent feature of the invention, the inside layer or layers of the composite inchoate sleeve are hardened before entering the second crosshead 38b. Said prior patent to Katz et al cited above discloses in FIG. 5 means 138, 140 for applying pressure from the outside on the enclosed space between the two crossheads.

Under normal process conditions, the internal layer or layers of compound are soft because of material characteristics and extrusion temperatures. As indicated above, the downstream crosshead 38b has very small tolerances with respect to the inchoate sleeve. Because of the softness of the compound and the relatively heavy thickness with which it needs to be extruded so that it can maintain its integrity and a certain minimum thickness when expanded several times its original diameter, this material tends to abrade against the walls of the opening through which it passes. The pressures on the insulation tend to cause the compound applied in the first crosshead 38a to bulge.

Figure 7:
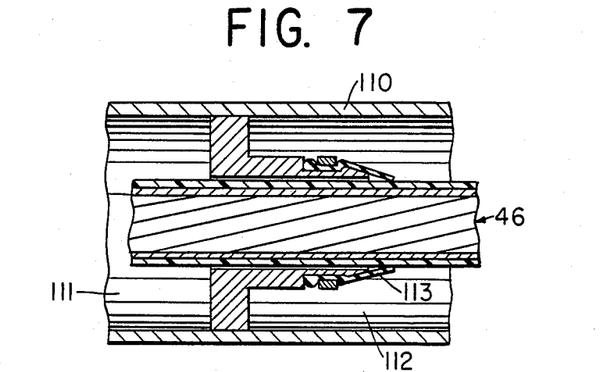
FIG. 7 is a longitudinal sectional view of a portion of FIG. 2 showing on a larger scale a seal for separating liquid nitrogen from a pressurized gas in accordance with the invention.

To minimize the damage to the outer surface of the inchoate sleeve when entering the second crosshead 38b, it has been found that a significant improvement can be achieved by a deep, fast cooling of the inchoate sleeve. For this purpose the outside pressure on the layers is applied through a liquid nitrogen system by means of a jacket 110 (FIGS. 2 and 7). That is, the space between the crossheads 38a and 38b is filled partially or completely with liquid nitrogen at a suitable pressure level In this manner, the polymeric layers are practically solidified shortly after extrusion, minimizing frictional deformation when entering the second crosshead 38b.

Contact of the liquid nitrogen with the high temperature polymer results in rapid evaporation of the nitrogen. It additionally cools the surface of the downstream crosshead 38b, if the two are allowed to come into contact. This may be undesirable; accordingly, it is preferable to divide the connection between the crossheads 38a and 38b into two sections. The first section 111 is filled with liquid nitrogen and the second 112 is filled with pressurized gas at a higher temperature. A seal 113 prevents leakage between the two sections 111 and 112.

The use of liquid nitrogen additionally allows for increased line speed when the limiting factor is the softness of the compound entering the second crosshead 38b. In an experimental run to make sleeves for 35 kV cable joints where the combined thickness of the inner layers being applied over a 250 mm$^2$ conductor was 3 mm and the line was running at 1.10 m/min., the pressure in the downstream crosshead 38b caused bulging of the compound over the core to such a degree that the run had to be stopped. After introducing the deep freezing with the liquid nitrogen, the run was continued without a problem. Subsequently, the speed was increased up to 20% without the same problem reappearing.

Thus there is provided in accordance with the invention a novel and highly-effective heat-shrinkable sleeve for use in splicing electrical cables and the like and a method and apparatus for manufacturing such sleeves. Many modifications of the preferred embodiments of the invention disclosed herein will readily occur to those skilled in the art. For example, the nature and characteristics of the polymers employed and the precise temperatures and dimensions can be varied within wide limits, as those in the art will readily appreciate. Accordingly, the invention includes all modifications and variations thereof which are within the scope of the appended claims.

What is claimed is:

1. A method of manufacturing long lengths of a heat-shrinkable sleeve for use in splicing electrical cables and the like, comprising:

providing an elongated impermeable core having a smooth outer surface, extruding an elongated sleeve around and in contact with said core, said sleeve having a smooth inner surface conforming to said outer surface of said core, effecting an initial expansion of a portion of said sleeve to a larger diameter in an expansion zone so that said sleeve separates from said core and leaves a pressurized space between said sleeve and core, and introducing a fluid into said space under pressure while continuously advancing said sleeve and core through said expansion zone, whereby successive portions of said sleeve are expanded by said fluid as they advance through said zone.

2. A method as in claim 1 wherein said impermeable core is formed with a leading end and said effecting of said initial expansion comprises the following steps performed before said leading end of said impermeable core reaches said expansion zone:

providing an elongated permeable core having a trailing end, extruding said sleeve around and in contact with said permeable core, introducing a fluid under pressure through said permeable core to the inside of said sleeve in said expansion zone, and forming a connection of said lead end of said impermeable core to said trailing end of said permeable core at a location upstream of said expansion zone.

3. A method as in claim 1 wherein said space is formed by fluid introduced via a location downstream of said expansion zone.

4. A method as in claim 2 wherein said fluid is introduced into said space via a location downstream of said expansion zone and is initially introduced through said permeable core to the inside of said sleeve via a location upstream of said expansion zone.

5. A method as in claim 1 wherein said fluid is introduced into said space via the downstream end of said sleeve.

6. A method as in claim 2 wherein said fluid is introduced into said space via the downstream end of said sleeve and is initially introduced through said permeable core to the inside of said sleeve via a location upstream of said expansion zone.

7. A method as in claim 2 comprising accumulating a length of said permeable core upstream of said expansion zone, before forming said connection, whereby said leading end of said impermeable core and said trailing end of said permeable core can be immobilized to facilitate forming said connection without interrupting the passage of successive portions of said sleeve and permeable core through said expansion zone.

8. A method as in claim 2 comprising supplying separate supply reels for said impermeable and permeable cores, respectively.

9. A method as in claim 2 wherein said connection is formed by welding.

10. A method as in claim 2 comprising the step of limiting the outside diameter of said impermeable core to a value substantially equal to the outside diameter of said permeable core.

11. Apparatus for manufacturing long lengths of a heat-shrinkable sleeve for use in splicing electrical cables and the like, comprising:

an elongated impermeable core having a smooth outer surface, means for extruding an elongated sleeve around and in contact with said core, said sleeve having a smooth inner surface conforming to said outer surface of said core, means for effecting an initial expansion of a portion of said sleeve to a larger diameter in an expansion zone so that said sleeve separates from said core and leaves a space between said sleeve and core, and means for introducing a fluid into said space under pressure while continuously advancing said sleeve and core through said expansion zone, whereby successive portions of said sleeve are expanded by said fluid as they advance through said zone.

12. Apparatus as in claim 11 wherein said impermeable core is formed with a leading end and said means for effecting said initial expansion comprises:

an elongated permeable core having a trailing end, a source of pressurized fluid and means for forming a connection of said leading end of said impermeable core to said trailing end of said permeable core at a location upstream of said expansion zone, said source introducing a fluid under pressure through said permeable core to the inside of said sleeve in said expansion zone to effect said initial expansion before said impermeable core enters said expansion zone.

13. Apparatus as in claim 11 wherein said means for introducing said fluid into said space comprises a fitting connected to said sleeve at a location downstream of said expansion zone.

14. Apparatus as in claim 12 wherein said means for introducing said fluid into said space comprises a fitting connected to said sleeve at a location downstream of said expansion zone, and wherein said source comprises a fitting connected to said permeable core at a location upstream of said expansion zone.

15. Apparatus as in claim 11 wherein said means for introducing said fluid into said space comprises a fitting connected to the downstream end of said sleeve.

16. Apparatus as in claim 12 wherein said means for introducing said fluid into said space comprises a fitting connected to the downstream end of said sleeve and wherein said source comprises a fitting connected to said permeable core at a location upstream of said expansion zone.

17. Apparatus as in claim 12 further comprising accumulator means mounted upstream of said expansion zone for accumulating a length of said permeable core before forming said connection, whereby said leading end of said impermeable core and said trailing end of said permeable core can be immobilized to facilitate forming said connection without interrupting the passage of successive portions of said sleeve and permeable core through said expansion zone.

18. Apparatus as in claim 12 further comprising a pair of supply reels for paying off said impermeable and permeable cores, respectively.

19. Apparatus as in claim 12 further comprising welding means for forming said connection.

20. Apparatus as in claim 12 wherein the outside diameter of said impermeable core is limited to a value substantially equal to the outside diameter of said permeable core.

21. A method of manufacturing long lengths of a heat-shrinkable sleeve for use in splicing electrical cables and the like, said sleeve having a composite structure comprising an inner compound and an outer compound, said inner and outer compounds having different characteristics, said method comprising the steps of:

providing first crosshead means having a tip, an intermediate aperture radially outward of said tip and a die radially outward of said intermediate aperture, passing a core through said tip and extruding said inner compound between said tip and intermediate aperture and said outer compound between said intermediate aperture and die, said intermediate aperture functioning as a die for said inner compound and as a tip for said outer compound, whereby an inchoate sleeve is formed around said core, providing second crosshead means, passing said core and inchoate sleeve through said second crosshead means, and extruding an additional quantity of said outer compound around said inchoate sleeve within said second crosshead means.

22. A method as in claim 21 comprising the step of selecting a semiconducting compound as said inner compound and an insulating compound as said outer compound.

23. A method as in claim 21 comprising the step of limiting the thickness of said outer compound extruded by said first crosshead means to substantially 0.04 inches.

24. A method as in claim 21 comprising the step of providing a tip in said second crosshead means having a diameter substantially equal to the diameter of said inchoate sleeve as it enters said second crosshead means.

25. A method as in claim 24 wherein the diameter of said tip of said second crosshead means exceeds the diameter of said core by substantially 0.01 to 0.04 inches.

26. Apparatus for manufacturing long lengths of a heat-shrinkable sleeve for use in splicing electrical cables and the like, said sleeve having a composite structure comprising an inner compound and an outer compound, said inner and outer compounds having different characteristics, said apparatus comprising:

first crosshead means having a tip, an intermediate aperture radially outward of said tip and a die radially outward of said intermediate aperture, means for advancing a core through said tip, means operatively associated with said first crosshead means for extruding said inner compound between said tip and intermediate aperture and said outer compound between said intermediate aperture and die, said intermediate aperture functioning as a die for said inner compound and as a tip for said outer compound, whereby an inchoate sleeve is formed around said core, second crosshead means mounted downstream of said first crosshead means, said core and inchoate sleeve passing through said second crosshead means, and means operatively associated with said second crosshead means for extruding an additional quantity of said outer compound around said inchoate sleeve.

27. Apparatus as in claim 26 wherein the extruding means operatively associated with said first crosshead means extrudes a semiconducting compound as said inner compound and an insulating compound as said outer compound and wherein the extruding means operatively associated with said second crosshead means extrudes said insulating compound.

28. Apparatus as in claim 26 wherein said first crosshead means extrudes said outer compound to a thickness of substantially 0.04 inches.

29. Apparatus as in claim 26 wherein said second crosshead means comprises a tip having a diameter substantially equal to the diameter of said inchoate sleeve as it enters said second crosshead means.

30. Apparatus as in claim 29 wherein the diameter of said tip of said second crosshead means exceeds the diameter of said core by substantially 0.01 to 0.04 inches.

31. A method of manufacturing long lengths of a heat-shrinkable sleeve for use in splicing electrical cables and the like, said method comprising the steps of:
providing first crosshead means,
passing a core through said first crosshead means and extruding a compound around said core to form an inchoate sleeve,
providing second crosshead means in spaced apart relation to said first crosshead means,
passing said core and inchoate sleeve through said second crosshead means and extruding additional compound around said inchoate sleeve, and
cooling said inchoate sleeve between said first and second crosshead means.

32. A method as in claim 31 wherein said cooling comprises the step of applying a cold fluid to said inchoate sleeve.

33. A method as in claim 31 wherein said cooling comprises the step of applying liquid nitrogen to said inchoate sleeve.

34. A method as in claim 31 wherein said cooling comprises the step of applying a cold fluid to said inchoate sleeve adjacent to said first crosshead means, further comprising the step of applying a pressurized gas to said inchoate sleeve adjacent to said second crosshead means.

35. A method as in claim 31 wherein said inchoate sleeve is hardened by said fluid before entering said second crosshead means.

36. Apparatus for manufacturing long lengths of a heat-shrinkable sleeve for use in splicing electrical cables and the like, said apparatus comprising:
first crosshead means for extruding a compound around a core passed therethrough to form an inchoate sleeve,
second crosshead means mounted in spaced-apart relation to said first crosshead means for receiving said inchoate sleeve and extruding additional compound around said inchoate sleeve, and
cooling means mounted between said first and second crosshead means for cooling said inchoate sleeve.

37. An apparatus as in claim 36 wherein said cooling means comprises means for applying a cold fluid to said inchoate sleeve.

38. Apparatus as in claim 36 wherein said cooling means comprises means for applying liquid nitrogen to said inchoate sleeve.

39. Apparatus as in claim 36 wherein said cooling means comprises means for applying a cold fluid to said inchoate sleeve adjacent to said first crosshead means, further comprising means adjacent to said second crosshead means for applying a pressurized gas to said inchoate sleeve.

40. Apparatus as in claim 36 wherein said cooling means substantially hardens said inchoate sleeve before said inchoate sleeve enters said second crosshead means.

41. A method of manufacturing long lengths of a heat-shrinkable sleeve for use in splicing electrical cables and the like, comprising:
providing an elongated core formed with a smooth impervious skin and an interior that will conduct a pressurized fluid,
advancing said core in an axial direction,
forming a sleeve of thermosetting material around said core and curing said sleeve,
heating and expanding said sleeve in an expansion zone, said expanding being effected by introducing pressurized fluid around the outside of said core between said sleeve and skin,
cooling said sleeve in a cooling zone to stabilize it in an expanded, heat-shrinkable condition,
winding a quantity of said expanded sleeve and core over a first take-up reel,
perforating a portion of said skin at a location upstream of said expansion zone and passing said perforated portion through said expansion and cooling zones,
heat-shrinking a portion of said sleeve onto said core to form a seal around said core at a location downstream of said perforated portion,
severing said sleeve and core at a cut downstream of said reel,
introducing a pressurized fluid into the interior of said core through said cut, whereby said pressurized fluid escapes through said perforated portion to continue the expansion of said sleeve, and
winding a quantity of said expanded sleeve and core upstream of said cut onto a second take-up reel.

42. A method according to claim 41 comprising the steps of applying a layer of material over said perforated portion to prevent said thermosetting material from clogging the perforations formed in said perforated portion.

43. A method according to claim 42 wherein said material is paper.

44. A method as in claim 1 wherein said sleeve has a composite structure comprising an inner compound and an outer compound, said inner and outer compounds having different characteristics, said extruding step comprising the steps of:
providing first crosshead means having a tip, an intermediate aperture radially outward of said tip and a die radially outward of said intermediate aperture,
passing said core through said tip and extruding said inner compound between said tip and intermediate aperture and said outer compound between said intermediate aperture and die, said intermediate aperture functioning as a die for said inner compound and as a tip for said outer compound, whereby a inchoate sleeve is formed around said core,
providing second crosshead means,
passing said core and inchoate sleeve through said second crosshead means, and
extruding an additional quantity of said outer compound around said inchoate sleeve within said second crosshead means.

45. Apparatus as in claim 11 wherein said sleeve has a composite structure comprising an inner compound and an outer compound, said inner and outer compounds having different characteristics, said means for extruding comprising:

first crosshead means having a tip, an intermediate aperture radially outward of said tip and a die radially outward of said intermediate aperture, means for advancing said core through said tip, means operatively associated with said first crosshead means for extruding said inner compound between said tip and intermediate aperture and said outer compound between said intermediate aperture and die, said intermediate aperture functioning as a die for said inner compound and as a tip for said outer compound, whereby an inchoate sleeve is formed around said core, second crosshead means mounted downstream of said first crosshead means, said core and inchoate sleeve passing through said second crosshead means, and means operatively associated with said second crosshead means for extruding an additional quantity of said outer compound around said inchoate sleeve.

* * * * *